T. B. DIXON.
TELEGRAPHY.
APPLICATION FILED NOV. 1, 1917.
1,397,576.
Patented Nov. 22, 1921.
2 SHEETS—SHEET 1.
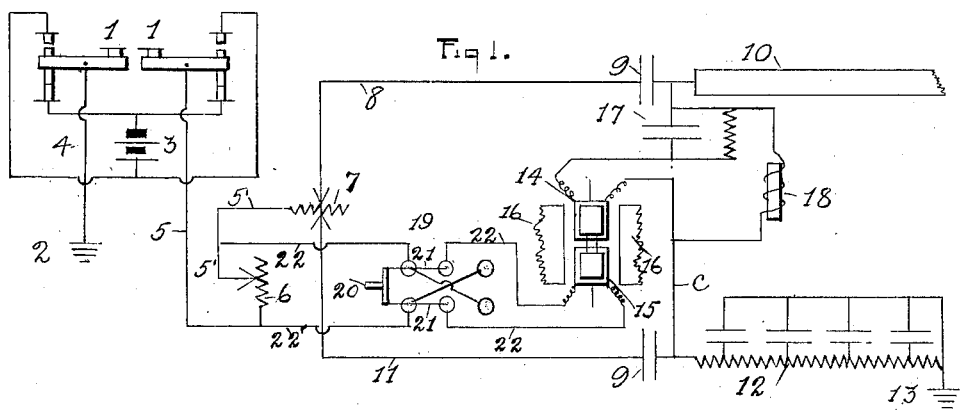
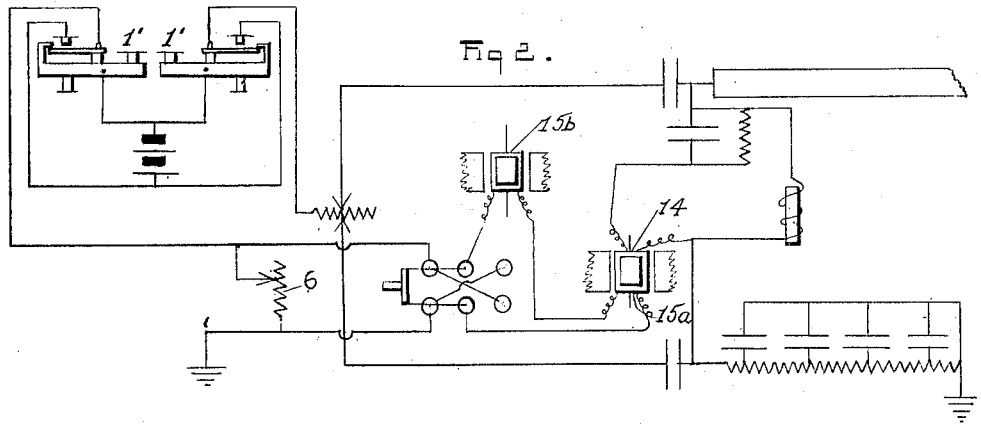
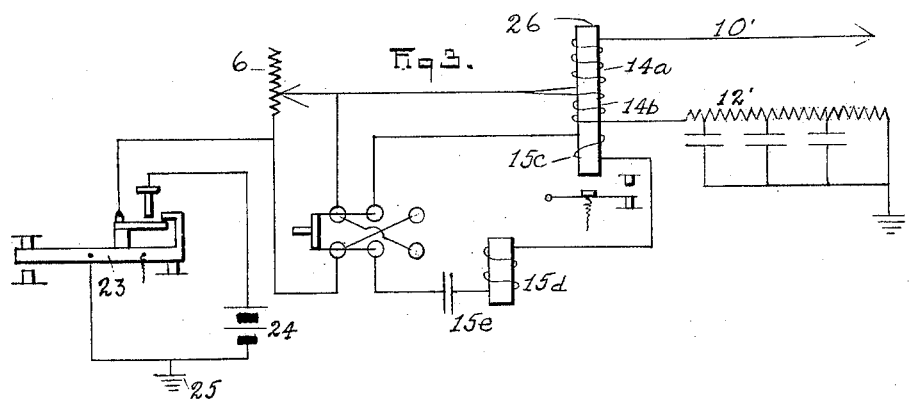
WITNESSES:
INVENTOR.
Thomas B. Dixon T. B. DIXON.
TELEGRAPHY.
APPLICATION FILED NOV. 1, 1917.
1,397,576.
Patented Nov. 22, 1921.
2 SHEETS—SHEET 2.
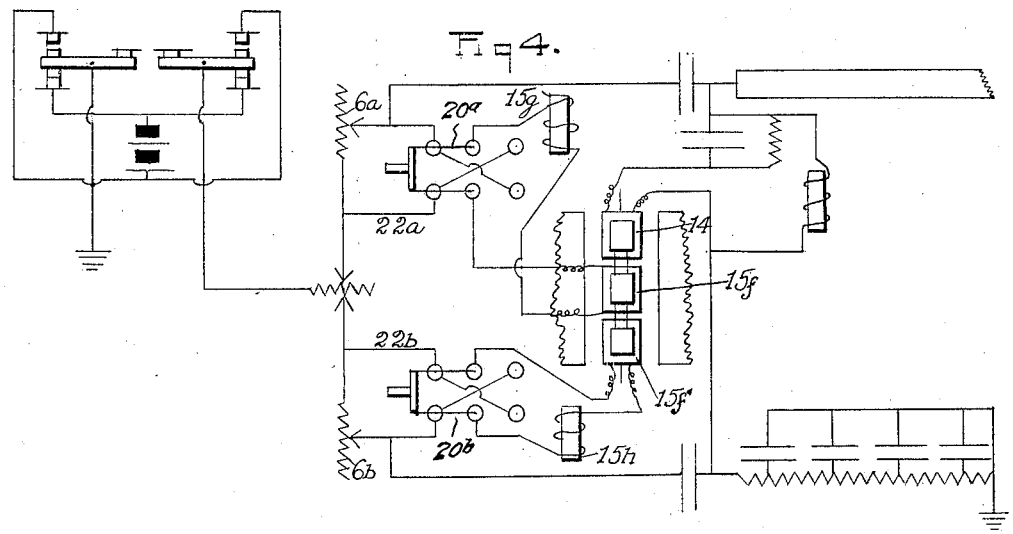
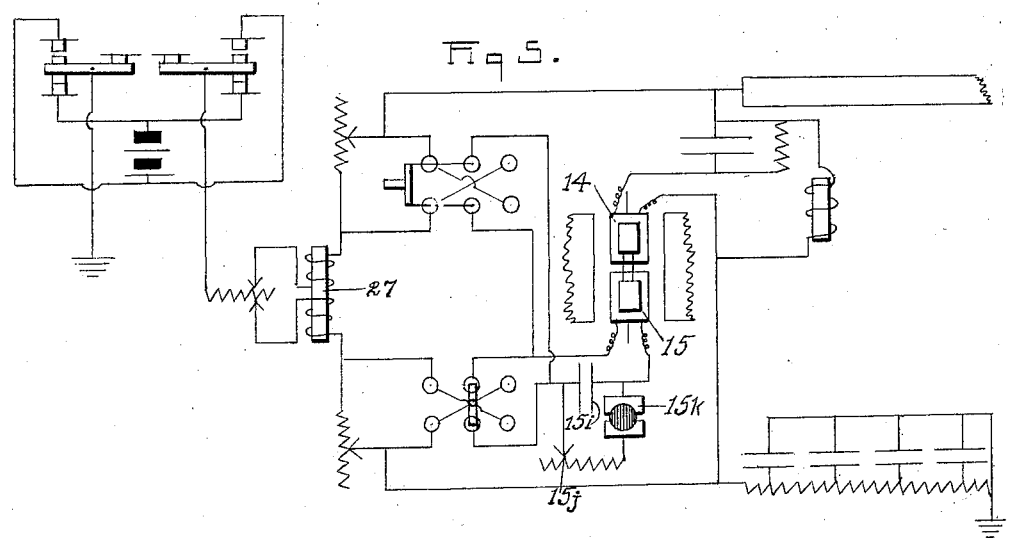
WITNESSES:
INVENTOR.
Thomas B. Dixon

UNITED STATES PATENT OFFICE.

THOMAS BULLITT DIXON, OF NEW YORK, N. Y.

TELEGRAPHY.

1,397,576. Specification of Letters Patent. Patented Nov. 22, 1921.

Application filed November 1, 1917. Serial No. 199,651.

*To all whom it may concern:*

Be it known that I, THOMAS BULLITT DIXON, a citizen of the United States of America, and a resident of New York city, county and State of New York, have invented new and useful Improvements in Telegraphy, of which the following is a specification.

My invention relates generally to telegraphy and particularly to duplex telegraphy, and comprises means whereby the effects of imperfect balance between the main and artificial lines of duplex systems may be neutralized, thereby permitting higher speeds of operation to be attained duplex than have been practicable in ordinary practice hitherto.

In the duplex operation of cables and of submarine cables especially it has hitherto in practice usually been found impossible to obtain such a perfect balance between the main and artificial lines as to eliminate all disturbances in the home receiving instrument due to outgoing home currents.

It is well understood that a perfect balance is obtainable only when the rate of flow as well as the time duration of flow of current into the main and artificial lines of a duplex system are equal, these factors being determined by the relative resistance and capacity of the main and artificial lines and the distribution thereof; and that an imperfect balance results when the flow of current into the main and artificial lines (*a*) is at the same rate but of different time duration, (*b*) has the same time duration but is of different rate, (*c*) has different time duration and different rate.

Ordinarily the balance between the main and artificial lines is obtained through varying the resistance and capacity of the artificial line and to some extent that of the cable as well with the view to making the electrical time factors of the main and artificial lines as exactly equal as possible. In the duplex operation of submarine cables in ordinary practice a large amount of time is usually required to make and maintain this balance even approximately satisfactory for duplex working where the ordinary siphon recorder is employed as the receiving instrument, and still more time and far greater difficulties are encountered when more sensitive receiving apparatus, such as "amplifiers" or "magnifiers," for example, are employed for reception of cable signals.

Where such sensitive receiving instruments are employed, it is usually in practice found impossible to maintain a "balance" which will permit duplex working at speeds comparable with those easily attainable when working only in one direction.

In my present invention I utilize a principle which, as far as I am aware, is new and novel, for overcoming the detrimental effects of imperfect balance, and the application of which is positive in action, does not distort or otherwise interfere with the incoming signals, which is as efficient at very high speeds as at very low or moderate speeds, and which requires a relatively small amount of labor and time to adjust and maintain in adjustment. This principle comprises the employment of disturbance neutralizing current (or currents) produced in any suitable manner but usually tapped or derived from the circuit of the outgoing current itself, and diverted so as to oppose and neutralize disturbances in the receiving instrument due to lack of perfect balance, this disturbance neutralizing outgoing current being usually tapped from the circuit either between the sending battery and the point of division between the main and artificial lines, or between the battery and the earth, although in some cases I may tap outgoing current from the main line circuit, or from the artificial line circuit or from both, or from any point (or points) or I may utilize current produced in any other suitable manner permitting the said disturbance neutralizing currents to have the same or substantially the same time and energy factors as the disturbance currents they are intended to neutralize.

The phrase outgoing current or outgoing currents, as employed in this specification and in the claims following, refers to and comprises both the current from the home battery flowing into the line and artificial line, when the line battery is in circuit, and the discharge currents from the line and artificial line which flow after battery has been cut out of circuit.

In the accompanying drawings I have shown my invention as applied to the bridge duplex ordinarily employed in the operation of ocean cables, and to the Stearns duplex as employed ordinarily for land line working in quadruplex systems, its further application to the polar duplex and to the various combinations of bridge and differential systems, being obvious to those skilled in the art.

My invention in general comprises means for producing and utilizing disturbance neutralizing currents, having proper time and energy factors, to counteract the effects on the receiving instruments of a duplex system of disturbance currents due to imperfect balance between main and artificial lines, and as usually arranged comprises means for tapping a portion of the outgoing signaling currents of a duplex system (usually during the variable period only) in such manner as to not materially conflict with the effects of the incoming signaling currents on the receiving instruments, this means usually consisting of a small non-inductive resistance or resistances so placed in circuit as to cause difference of potential between conductors attached to their terminals, of means usually consisting of a coil or coils of wire for utilizing the effects of current so tapped to oppose and neutralize the disturbances caused otherwise by imperfect balance; of means for reversing the circuit connections of such neutralizing coil or coils so that the neutralizing currents may be readily and conveniently given proper direction; and of other features hereinafter set forth.

In the accompanying drawings I illustrate diagrammatically several arrangements embodying my said invention.

In the said drawings:

Figure 1 is a diagram showing my invention applied to a bridge duplex as ordinarily employed on a submarine cable.

Fig. 2 shows an alternative form of the apparatus illustrated in Fig. 1.

Fig. 3 shows my invention applied to a Stearns differential duplex system, such as ordinarily employed in working land telegraph lines.

Fig. 4 shows a further alternative form of my invention as illustrated in Figs. 1 and 2.

Fig. 5 shows an alternative form of the apparatus illustrated in Fig. 4, in which my invention, applied to a duplex system employing a magnetic bridge in lieu of the usual block condensers, is illustrated.

Referring first to Fig. 1; 1 1 are transmitting keys, 2 the earth, 3 the home transmitting battery, 4 a wire connecting the left-hand key with the earth, and 5 a wire connecting the right-hand key through the adjustable non-inductive resistance 6 and wire 5' to the usual quarter ohm adjustable resistance 7, which connects with wire 8 leading through the usual block condenser 9 to the cable 10 and with wire 11 leading through the companion block condenser 9 to the artificial line 12, which is connected to earth at 13. 14 is the usual signaling coil of the home receiving instrument, and attached rigidly to it is a disturbance neutralizing coil 15, both coils being suspended between pole pieces 16 of a suitable magnet. The coil 14 is connected in the usual way in the cross wire C of the bridge, which also includes the usual shunted receiving condenser 17, and inductive resistance 18. The coil 15 has its terminals connected to a pole changing switch 19, having a handle 20 which may be thrown to the left or to the right, this handle carrying with it blades 21 which connect with wires 22, as shown, in such manner that when the handle 20 points to the left, current flowing through the circuit of wires 22 and coil 15 will flow in the opposite direction to that in which it will flow when the handle 20 is thrown over and points to the right, such pole changing switches being well known. Let it be assumed that there is an imperfect balance between cable 10 and artificial line 12 so that when either of the transmitting keys 1—1 is operated, outgoing current flows through the cross wire C and signaling coil 14 so as to cause a false movement of the coil 14. Under these conditions resistance 6 is adjusted to a value just sufficient to send enough current through coil 15 to neutralize the effect of the current flowing through coil 14, the switch 19 being set so that the current flowing through coil 15 is of proper direction for this purpose. Assuming the winding of coil 15 to exactly equal that of coil 14 in number of turns and size of wire, its self-induction will equal that of coil 14 so that no time factor error will result from unequal self-induction of coils 14 and 15. It will be seen that the currents through coil 14 caused by imperfect balance will be neutralized since, with proper adjustment of resistance 6, the opposing currents caused to flow through coil 15, which are a small fraction of the sum of the outgoing currents flowing into the main and artificial lines and of the discharge currents therefrom will have time and energy factors corresponding substantially to that of the currents flowing through coil 14.

In Fig. 2 instead of winding the signaling and neutralizing coils separately and mechanically connecting them together as in Fig. 1, I wind the neutralizing coil 15$^a$ with only a few turns as compared with coil 14, the two coils being wound one over the other, and connect in series with a coil 15$^b$ which has a larger number of turns so that the self-induction factor in the circuit of coil 15$^a$ will equal that in the circuit of coil 14. Also, in this figure I show the resistance 6 placed at a point in the circuit between the battery and the earth, and the transmitting keys, here designated 1' 1', provided with continuity preserving contacts. Otherwise the arrangement in Fig. 2 exactly corresponds to that shown in Fig. 1. The arrangement shown in Fig. 2 has an advantage over the arrangement shown in Fig. 1 in that the inertia of coil 15ª is less than that of coil 15.

In Fig. 3 I show my invention as applied to a Stearns duplex for land line working. 23 is the usual continuity preserving key connecting with a line battery 24, earthed at 25. 26 is a differentially wound relay electromagnet with a main coil tapped in the middle so as to form two sections 14ª and 14ᵇ and a disturbance neutralizing winding 15ᶜ on the core of said magnet having a function similar to that of coil 15 already described, while 15ᵈ is an inductive resistance in series with coil 15ᶜ, the function of which is to make the self-induction in the circuit of coil 15ᶜ due to coil windings equal to the other windings on magnet 26, and 15ᵉ a condenser placed in circuit with disturbance neutralizing coil, an arrangement I prefer, usually, to employ when the main and artificial lines are not provided with block condensers. When there is a lack of balance between the line 10′ and the artificial line 12′ this lack of balance is neutralized by current flowing through coil 15ᶜ in a direction to oppose the effect of the current consequently flowing through the said sections 14ª and 14ᵇ of magnet 26. It will be obvious that a differentially wound movable coil, such as is commonly employed in differential galvanometers, may be employed as the signaling instrument, in place of employing the stationary differentially wound coil, shown in this figure, where desired, for either land line or cable working.

Referring now to Fig. 4, 6ª and 6ᵇ are adjustable resistances, preferably arranged to be capable of adjustment or readjustable to the same values usually; disturbance neutralizing coils 15ᶠ and 15ᶠ′, shown mechanically attached to coil 14, as in Fig. 1, are in series with inductances 15ᵍ and 15ʰ respectively in circuits of conductors 22ª and 22ᵇ, controlled by pole-changing switches 20ª and 20ᵇ, so that neutralizing currents resulting from the differences of potential at terminals of resistances 6ª and 6ᵇ will influence coils 15ᶠ and 15ᶠ′ in such manner as to counteract the effects of balance disturbances in coil 14. The blades of the pole-changing switches are adjusted so that the disturbance neutralizing currents in each coil are in the same direction, the current in each coil opposing the disturbance currents, due to imperfect balance, influencing coil 14. Instead of placing the block condensers in circuit between resistances 6ª and 6ᵇ and the cable and artificial lines respectively, as shown in this figure, I may, in some cases, place them in circuit intermediate the point of division between the main and artificial lines and the resistances 6ª and 6ᵇ.

In Fig. 5 I show a cable duplex system in which the well known magnetic bridge, designated 27, is employed, the usual block condensers being dispensed with, and only a single disturbance neutralizing coil employed, as in Fig. 1, etc. The two pole-changing switches are arranged as shown so that one switch is normally closed and the other normally open, one switch controlling current tapped from the main line circuit and the other controlling current tapped from the artificial line circuit. In this arrangement a condenser, 15ⁱ, shunted by an adjustable resistance 15ʲ in series with a cut out plug switch 15ᵏ, is shown in circuit with the disturbance neutralizing coil. In the arrangement shown in this figure I may sometimes adjust the resistances corresponding to 6ª and 6ᵇ of Fig. 4 to slightly different values to compensate for the joint resistance effect of coil 15 and resistance 15ʲ, which as shown in the figure are connected through the upper pole changing switch so as to form a joint resistance with the upper resistance. Or I may make the upper and lower resistances exactly equal and arrange to compensate for the effect of coil 15, resistance 15ⁱ, and condenser 15ʲ, by connecting through a suitable switch or otherwise a compensating coil of proper value such as coil 15ᵇ of Fig. 2 as a shunt around the lower resistance when the upper resistance is connected with coil 15 and vice versa; and I may employ in circuit with such compensating coil a condenser with resistance shunting it as shown in connection with coil 15 of Fig. 5. Also, the single neutralizing coil and connections with the pole changing switches of this figure are, obviously, equally applicable to the method of transmission through block condensers, as shown in Fig. 4.

When adjusted as described, it will be seen that while the neutralizing currents tapped from the terminals of resistances 6, 6ª or 6ᵇ, etc., will neutralize the effects on the receiving instruments of disturbance currents due to lack of perfect balance between the main and artificial lines, the signaling currents from the distant end can have no appreciable effect on the disturbance neutralizing coils since the very small fraction of such currents diverted by resistance 6, etc., will be so small as to be negligible, while the diverted fractional part of the outgoing currents from home battery, because of the relatively vastly greater strength of such outgoing currents, will be of proper values to neutralize balance disturbances, as above described.

The operation of the apparatus shown in Fig. 1 is as follows: Operation of either of transmitting keys 1 1 to make the customary dots or dashes of the cable code causes a flow of current into the cable 10 and artificial line 12 and a resulting flow of current, assuming a lack of perfect balance, through coil 14, the effect of which on coil 14 is neutralized by a flow of current through coil 15 so that no movement of coil 14 results.

The operation of the apparatus shown in Fig. 2 is similar to that shown in Fig. 1, except that the coil $15^b$ will have a small motion if freely suspended. In general I prefer to vary the torsional suspension of coil $15^b$ to a point where the motion of the coil becomes practically *nil* after the motion of coil 14 has become *nil* as a result of the disturbance neutralizing currents influencing coil $15^a$.

Referring now to the operation of the apparatus shown in Fig. 3, the operation of transmitter 23 cuts in and out of circuit battery 24, the outgoing current dividing between the main windings of magnet 26 and main line 10′ and the artificial line 12′ in the usual way, a small portion of such current being diverted, owing to resistance 6, through coils $15^c$ and $15^d$ so as to neutralize the effects of currents in the main windings due to lack of perfect balance between the line 10′ and artificial line 12′.

The operation of arrangements shown in Figs. 4 and 5 will be obvious from the foregoing and need not be particularly described.

While in general I prefer to employ resistance elements 6, $6^a$, $6^b$, etc., having a low ohmic resistance, it will be readily seen that for best results there must be a definite relation between the values of the said resistances and the number of turns in the winding of the disturbance neutralizing coil or coils, and that if a minimum number of turns be employed, a single turn for example, the said resistances should be very large, and in some cases removed entirely—this being equivalent to giving them an infinitely high value—so that the entire outgoing current or currents flows through the coil or coils, in which case, however, the effect of the incoming currents on these coils will still be practically *nil* because of the small number of turns in the winding of the disturbance neutralizing coil or coils as compared with the winding of the signaling coil. Therefore, the employment of the term resistance herein in reference to elements $6^a$, etc., is intended to comprise any resistance value between zero and infinity.

Obviously, many arrangements of my invention other than the exact arrangements herein shown may be made without departure from the scope thereof, and I do not limit myself to the exact arrangements herein illustrated and described.

What I claim is:

1. The method of neutralizing the effects of disturbing currents on the home receiving instrument, due to outgoing signaling currents from the home battery sent to line under conditions of imperfect balance between the main and artificial lines, which consists in utilizing outgoing currents having time and energy factors corresponding substantially to the time and energy factors of the disturbing currents to neutralize their own disturbing effects on the home receiving instrument.

2. The method of neutralizing the effects of disturbing currents on the home receiving instrument, due to outgoing signaling currents from the home battery sent to line under conditions of imperfect balance between the main and artificial lines, which consists in utilizing a part of the outgoing currents so directed as to oppose and neutralize the effects of said disturbing currents by opposing said part of the outgoing currents to the disturbing currents, said part of the outgoing currents having time and energy factors corresponding substantially to the time and energy factors of the disturbing currents.

3. The method of neutralizing the effects of disturbing currents on the home receiving instrument, due to outgoing signaling currents from the home battery sent to line under conditions of imperfect balance between the main and artificial lines, which consists in employing neutralizing currents, having time and energy factors corresponding substantially to the time and energy factors of the disturbing currents, to oppose and neutralize the effects of said disturbing currents.

4. The method of neutralizing the effects of disturbing currents on the home receiving instrument, due to outgoing signaling currents from the home battery sent to line under conditions of imperfect balance between the main and artificial lines, which consists in employing properly directed regulatable neutralizing currents, fed from the outgoing currents and synchronizing with the disturbance currents, to oppose and neutralize the effects of said disturbance currents.

5. The method of neutralizing the effects of disturbing currents on the home receiving instrument, due to outgoing signaling currents from the home battery sent to line under conditions of imperfect balance between the main and artificial lines, which consists in employing properly directed regulatable neutralizing currents fed from the outgoing currents, and having time and energy factors corresponding substantially to the time and energy factors of the disturbing currents, to act in opposition to said disturbing currents for the purpose of neutralizing them.

6. The method of neutralizing the effects of disturbing currents on the home receiving instrument, due to outgoing signaling currents from the home battery sent to line under conditions of imperfect balance between the main and artificial lines, which consists in employing properly directed regulatable neutralizing currents, having time and energy factors corresponding substantially to the time and energy factors of the disturbing currents, to act in opposition to said disturbing currents.

7. In duplex telegraphy, means for neutralizing the effects of disturbing currents on the home receiving instrument, due to outgoing signaling currents from the home battery sent to line under conditions of imperfect balance between the main and artificial lines, embodying main and artificial lines, having distributed resistances and capacities designed to balance each other electrically, in combination with disturbance neutralizing means for influencing the signal receiving means and for neutralizing the effects of the disturbance currents under conditions of imperfect balance between the main and artificial lines, said disturbance neutralizing means being caused to function by suitably directed outgoing currents.

8. In duplex telegraphy, means for neutralizing disturbing effects, due to imperfect balance between the main and artificial lines, embodying a disturbance neutralizing coil attached to and adapted to influence the movements of the signaling coil, means for diverting a portion of the outgoing current for actuating said disturbance neutralizing coil, and means for equalizing the self-induction of said signaling and disturbance neutralizing coils.

9. In duplex telegraphy, in combination, a main and artificial line, a signal receiving coil and a disturbance neutralizing coil, attached one to the other, so as to move together, a signaling battery, transmitting keys, a resistance in circuit with said battery, conductors connecting the terminals of said resistance with the terminals of said disturbance neutralizing coil, whereby neutralizing currents are diverted to influence said disturbance neutralizing coil.

10. In duplex telegraphy, in combination, a main and artificial line, a signal receiving coil and a disturbance neutralizing coil, attached one to the other, so as to move together, a signaling battery, transmitting keys, a resistance in circuit with said battery, conductors connecting the terminals of said resistance with the terminals of said disturbance neutralizing coil, whereby neutralizing currents are diverted to influence said disturbance neutralizing coil, and a pole changing switch in the circuit of said coil for reversing the circuit connections of said coil.

11. In duplex telegraphy, in combination, a main and artificial line, a signal receiving coil and a disturbance neutralizing coil, attached one to the other, so as to move together, a signaling battery, transmitting keys, a resistance in circuit with said battery, conductors connecting the terminals of said resistance with the terminals of said disturbance neutralizing coil, whereby neutralizing currents are diverted to influence said disturbance neutralizing coil, and an inductive resistance in circuit with said coil, whereby the self-induction of said coil is made equal to that of signal receiving coil.

12. In duplex telegraphy, in combination, a main and artificial line, a signal receiving coil and a disturbance neutralizing coil, attached one to the other, so as to move together, a signaling battery transmitting keys, a resistance in circuit with said battery, conductors connecting the terminals of said resistance with the terminals of said disturbance neutralizing coil, whereby neutralizing currents are diverted to influence said disturbance neutralizing coil, an inductive resistance in circuit with said coil, whereby the self-induction of said coil is made equal to that of the signal receiving coil, and a pole changing switch in the circuit of said coil for reversing its circuit connections.

13. In duplex telegraphy, in combination with main and artificial lines, a signal receiving coil and a disturbance neutralizing coil arranged to mutually influence each other, a signaling battery, at least one transmitting key, a resistance in circuit with said battery, conductors connecting the terminals of said resistance with the terminals of said disturbance neutralizing coil, whereby neutralizing currents are diverted so as to influence said disturbance neutralizing coil.

14. In duplex telegraphy, in combination with main and artificial lines, a signal receiving coil and a disturbance neutralizing coil, arranged to mutually influence each other, a signaling battery, at least one transmitting key, a resistance in circuit with said battery, conductors connecting the terminals of said resistance with the terminals of said disturbance neutralizing coil whereby neutralizing currents are diverted so as to influence said disturbance neutralizing coil, and an inductive resistance in circuit with said coil, whereby the self-induction of said coil is made to correspond to that of the signal receiving coil.

15. In duplex telegraphy, in combination with main and artificial lines, a signal receiving coil and a disturbance neutralizing coil arranged to mutually influence each other, a signaling battery, at least one transmitting key, a resistance in circuit with said battery, conductors connecting the terminals of said resistance with the terminals of said disturbance neutralizing coil, whereby neutralizing currents are diverted so as to influence said disturbance neutralizing coil, an inductive resistance in circuit with said coil, whereby the self-induction of said coil is made to correspond to that of the signal receiving coil, and a pole changing switch in the circuit of said coil for reversing its circuit connections.

16. In duplex telegraphy, in combination, main and artificial lines, a signal receiving coil and disturbance neutralizing coils, arranged to mutually influence each other, a signaling battery, at least one transmitting key, a resistance in the main line circuit havings its terminals connected by conductors with the terminals of one of said disturbance neutralizing coils, a resistance in the artificial line circuit, having its terminals connected by suitable conductors with the other disturbance neutralizing coil, whereby neutralizing currents are diverted so as to influence said disturbance neutralizing coils.

17. In duplex telegraphy, in combination, main and artificial lines, a signal receiving coil and disturbance neutralizing coils, arranged to mutually influence each other, a signaling battery, at least one transmitting key, a resistance in the main line circuit having its terminals connected by conductors with the terminals of one of said disturbance neutralizing coils, a resistance in the artificial line circuit, having its terminals connected by suitable conductors with the other disturbance neutralizing coil, whereby neutralizing currents are diverted so as to influence said disturbance neutralizing coils, and an inductive resistance in circuit with each of said disturbance neutralizing coils.

18. In duplex telegraphy, in combination, main and artificial lines, a signal receiving coil and disturbance neutralizing coils, arranged to mutually influence each other, a signaling battery, at least one transmitting key, a resistance in the main line circuit having its terminals connected by conductors with the terminals of one of said disturbance neutralizing coils, a resistance in the artificial line circuit, having its terminals connected by suitable conductors with the other disturbance neutralizing coil, whereby neutralizing currents are diverted so as to influence said disturbance neutralizing coils, an inductive resistance in circuit with each of said disturbance neutralizing coils, and a pole changing switch in the circuit of each of said coils for reversing its circuit connections.

19. In duplex telegraphy, means for neutralizing the effects of disturbing currents on the home receiving instrument, due to outgoing signaling currents from the home battery sent to line under conditions of imperfect balance between the main and artificial lines, embodying main and artificial lines, having distributed resistances and capacities designed to balance each other electrically, in combination with regulatable disturbance neutralizing means influencing the signal receiving means and neutralizing the effects of the disturbance currents under conditions of imperfect balance between the main and artificial lines, said disturbance neutralizing means being caused to function by suitably directed outgoing currents.

20. In duplex telegraphy, means for neutralizing disturbing effects, due to imperfect balance between the main and artificial lines, embodying a disturbance neutralizing coil attached to and adapted to influence the movements of the signaling coil, and means for diverting and properly directing a portion of the outgoing current for actuating said disturbance neutralizing coil.

21. In duplex telegraphy, means for neutralizing disturbing effects, due to imperfect balance between the main and artificial lines, embodying disturbance neutralizing coils attached to and adapted to influence the movements of the signaling coil, means for diverting a portion of the outgoing current for actuating said disturbance neutralizing coils, and means for equalizing the self induction of said signaling and disturbance neutralizing coils.

22. In duplex telegraphy, means for neutralizing disturbing effects, due to imperfect balance between the main and artificial lines, embodying signal receiving and disturbance neutralizing coils arranged to mutually influence each other, and means for equalizing the self induction effects of said coils.

23. In duplex telegraphy, means for neutralizing disturbing effects, due to imperfect balance between the main and artificial lines, embodying signal receiving and disturbance neutralizing coils arranged to mutually influence each other, and means for supplying and suitably directing currents of proper values to the neutralizing coil whereby the effects of the disturbing currents flowing through the signaling coil are neutralized.

24. In duplex telegraphy, means for neutralizing disturbing effects, due to imperfect balance between the main and artificial lines, embodying a signaling coil and a disturbance neutralizing coil connected with and adapted to prevent the movements of said signaling coil through the action of outgoing currents, said disturbance neutralizing coil being directly actuated by suitably directed currents fed from the circuit of said outgoing currents.

25. In duplex telegraphy, means for neutralizing disturbing effects, due to imperfect balance between the main and artificial lines, embodying signal receiving and disturbance neutralizing coils arranged to mutually influence each other, and means for diverting and properly directing a portion of the outgoing current for actuating said disturbance neutralizing coil.

26. In duplex telegraphy, means for neutralizing disturbing effects, due to imperfect balance between the main and artificial lines, embodying signal receiving and disturbance neutralizing means arranged to mutually influence each other, and means for diverting and properly directing outgoing current for actuating said disturbance neutralizing means.

In testimony whereof I have signed this specification in the presence of two subscribing witnesses.

THOMAS BULLITT DIXON.

Witnesses:
  BENJ. G. SIMPSON,
  F. LOUGHRAN.